United States Patent
Okuno

(10) Patent No.: US 11,483,440 B2
(45) Date of Patent: Oct. 25, 2022

(54) FUNCTION EXECUTING DEVICE DISPLAYS APPROVAL SCREENS, WHEN EXECUTING REQUESTS RECEIVE FROM EXTERNAL DEVICES, FOR EXECUTING FIRST AND SECOND FUNCTIONS

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/216,844

(22) Filed: Mar. 30, 2021

(65) Prior Publication Data

US 2021/0306488 A1 Sep. 30, 2021

(30) Foreign Application Priority Data

Mar. 31, 2020 (JP) .............................. JP2020-063608

(51) Int. Cl.
*H04N 1/00* (2006.01)
(52) U.S. Cl.
CPC ..... *H04N 1/00474* (2013.01); *H04N 1/00244* (2013.01); *H04N 1/00938* (2013.01); *H04N 1/00408* (2013.01); *H04N 2201/0094* (2013.01)
(58) Field of Classification Search
None
See application file for complete search history.

(56) References Cited

U.S. PATENT DOCUMENTS

| | | | | |
|---|---|---|---|---|
| 11,082,569 | B2 * | 8/2021 | Maruyama | ......... H04N 1/00129 |
| 2009/0237725 | A1 | 9/2009 | Hamaguchi | |
| 2013/0063759 | A1 * | 3/2013 | Kutoh | ..................... G06F 21/40 358/1.14 |
| 2013/0265605 | A1 * | 10/2013 | Suzuki | ............... H04N 1/00225 358/1.15 |
| 2014/0002861 | A1 * | 1/2014 | Kuwahara | .......... H04N 1/33315 358/1.15 |
| 2016/0028919 | A1 * | 1/2016 | Nakajima | .......... H04N 1/00307 358/1.15 |
| 2019/0121629 | A1 | 4/2019 | Matsui et al. | |

FOREIGN PATENT DOCUMENTS

| | | |
|---|---|---|
| JP | 2009-225316 A | 10/2009 |
| JP | 2019-079111 A | 5/2019 |

* cited by examiner

*Primary Examiner* — Haris Sabah
(74) *Attorney, Agent, or Firm* — Scully Scott Murphy and Presser

(57) ABSTRACT

A function executing device may receive a first function executing request from a first external device and receive a second function executing request from a second external device. The function executing device may display, in a case where the first function executing request is received, a first approval screen on the display. The function executing device may display, in a case where the second function executing request is received, a second approval screen on the display. In a case where the second function executing request is received under a state where the first approval screen is displayed on the display, the second approval screen may not be displayed on the display instead of the first approval screen.

11 Claims, 9 Drawing Sheets

(Screen Displayed on PC 100 after T300 of Pattern A of FIG. 8)

(Screen Displayed on PC 100 after T310 of Pattern B of FIG. 8)

FUNCTION EXECUTING DEVICE DISPLAYS APPROVAL SCREENS, WHEN EXECUTING REQUESTS RECEIVE FROM EXTERNAL DEVICES, FOR EXECUTING FIRST AND SECOND FUNCTIONS

CROSS-REFERENCE TO RELATED APPLICATION

This application claims priority to Japanese Patent Application No. 2020-063608, filed on Mar. 31, 2020, the entire contents of which are hereby incorporated by reference into the present application.

TECHNICAL FIELD

The disclosure herein discloses a technique relating to a function executing device configured to display an approval screen.

BACKGROUND ART

A remote operation system including an information processing device and an image processing device is known. When accepting an operation on a remote maintenance button, the image processing device sends a remote maintenance request to the information processing device and receives a response to the remote maintenance request from the information processing device. As a result, the image processing device can accept a remote operation from the information processing device.

SUMMARY

The disclosure herein provides a technique for appropriately displaying an approval screen for approving that a function executing device is to execute a function.

A function executing device disclosed herein may comprise: a communication interface; a display; and a controller configured to: receive a first function executing request from a first external device via the communication interface; receive a second function executing request from a second external device via the communication interface, the second function executing request being different from the first function executing request; in a case where the first function executing request is received from the first external device, display a first approval screen on the display, the first approval screen being for approving that the function executing device is to execute a first function; and in a case where the second function executing request is received from the second external device, display a second approval screen on the display, the second approval screen being different from the first approval screen, the second approval screen being for approving that the function executing device is to execute a second function different from the first function, wherein in a case where the second function executing request is received from the second external device under a state where the first approval screen is displayed on the display, the second approval screen is not displayed on the display instead of the first approval screen.

A control method, a computer program, and a computer-readable medium storing the computer program for implementing the above function executing device are also novel and useful. Moreover, a communication system comprising the above function executing device, first external device, and second external device is also novel and useful.

BRIEF DESCRIPTION OF THE DRAWINGS

EMBODIMENTS (Configuration of Communication System 2; FIG. 1)

As shown in FIG. 1, a communication system 2 comprises a multi-function peripheral (hereinbelow termed "MFP") 10, a PC 100, a mobile terminal 200, and a server 300. The MFP 10, the PC 100, and the mobile terminal 200 are connected with the Internet 4 via a LAN (local area network) 6. The server 300 is connected with the Internet 4. Thus, the MFP 10, the PC 100, and the mobile terminal 200 are capable of communicating with the server 300 via the Internet 4. The PC 100 is used by an administrator of the MFP 10. The mobile terminal 200 is a terminal device used by a user (hereinbelow this user may be termed "general user") different from the administrator of the MFP 10.

(Configuration of MFP 10)

Figure 1:
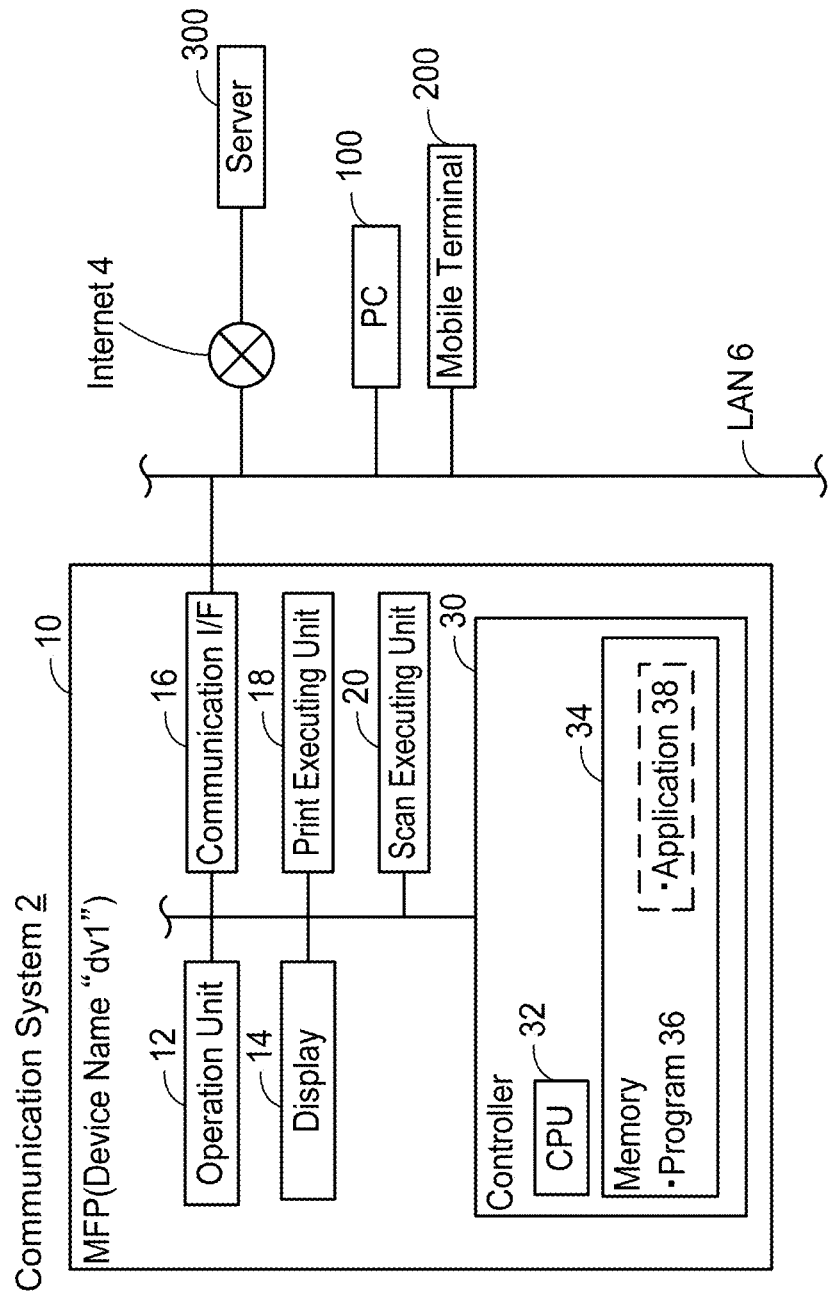
FIG. 1 shows a configuration of a communication system.

The MFP 10 is a peripheral (i.e., a peripheral of the PC 100) configured to execute multiple functions including a print function, a scan function, a FAX function, a web server function, etc. The web server function is a function of sending web page data representing a web page to an external device in response to the external device accessing a web server of the MFP 10. The MFP 10 comprises an operation unit 12, a display 14, a communication interface 16 (hereinbelow, interface will be denoted as "I/F"), a print executing unit 18, a scan executing unit 20, and a controller 30. A device name "dv1" is assigned to the MFP 10.

The operation unit 12 comprises a plurality of keys. A user can input various instructions to the MFP 10 by operating the operation unit 12. The display 14 is a display for displaying various types of information. The communication I/F 16 is connected with the LAN 6. The communication I/F 16 may be a wireless I/F, or may be a wired I/F. The print executing unit 18 comprises a printing mechanism of ink jet scheme, laser scheme, or the like. The scan executing unit 20 comprises a scanning mechanism of CCD, CIS, or the like.

The controller 30 comprises a CPU 32 and a memory 34. The CPU 32 is configured to execute various processes in accordance with a program 36 stored in the memory 34. The memory 34 is configured of a volatile memory, a non-volatile memory, and the like. The memory 34 can further store a download print application 38 (which will hereinbelow be simply termed "application 38"). The application 38 is installed to enable the MFP 10 to execute a download print function. The download print function is a function of downloading image data stored in the server 300 and printing an image represented by that image data.

(Configuration of Server 300)

The server 300 is installed on the Internet 4 and provided by a vendor of the MFP 10, for example. The server 300 is a server for providing a service. In a variant, the server 300 may be installed on the Internet 4 by a business entity different from the vendor of the MFP 10. The server 300 stores a plurality of image data files that can be provided to the MFP 10.

Figure 2:
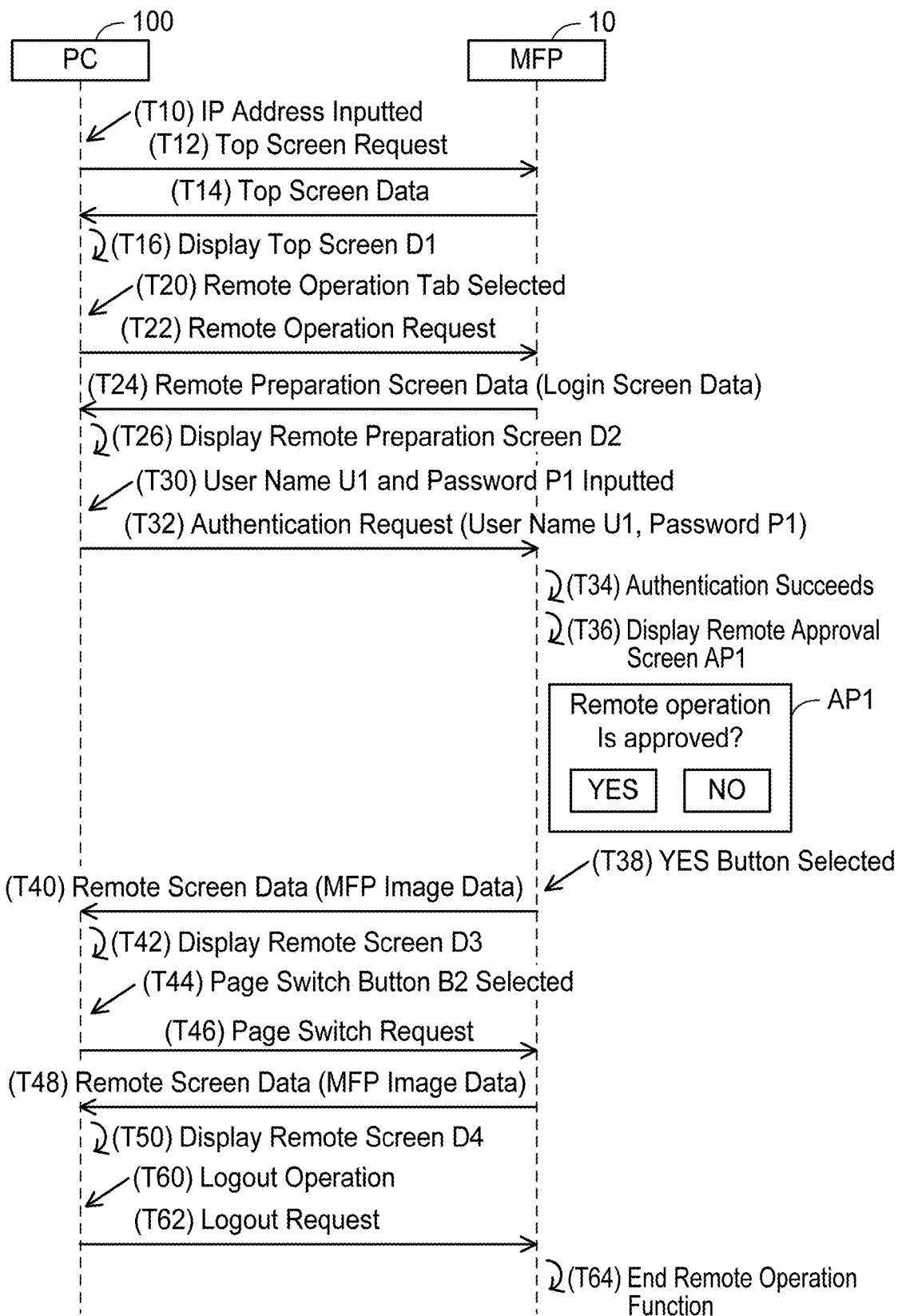
FIG. 2 shows a sequence diagram of a remote operation process.

(Remote Operation Process; FIG. 2)

A remote operation process for causing the MFP 10 to execute a remote operation function will be described with reference to FIG. 2. The remote operation function is a function of causing the PC 100 to display a screen with the same contents as the contents of a screen being displayed on the display 14 of the MFP 10, and in response to the screen on the PC 100 being operated, the MFP 10 executing the same process as the process the MFP 10 executes when the screen on the display 14 is operated. In an initial state of FIG. 2, a user name U1 and a password P1 have already been registered in the memory 34 of the MFP 10. Hereinbelow, to facilitate understanding, steps executed by the CPU 32 of the MFP 10 may be described with the MFP 10 as the subject of action, not with the CPU 32 as the subject of action. Further, every communication executed by the MFP 10 is via the communication I/F 16. Therefore, hereinbelow, the phrase "via the communication I/F 16" will be omitted.

Figure 9:
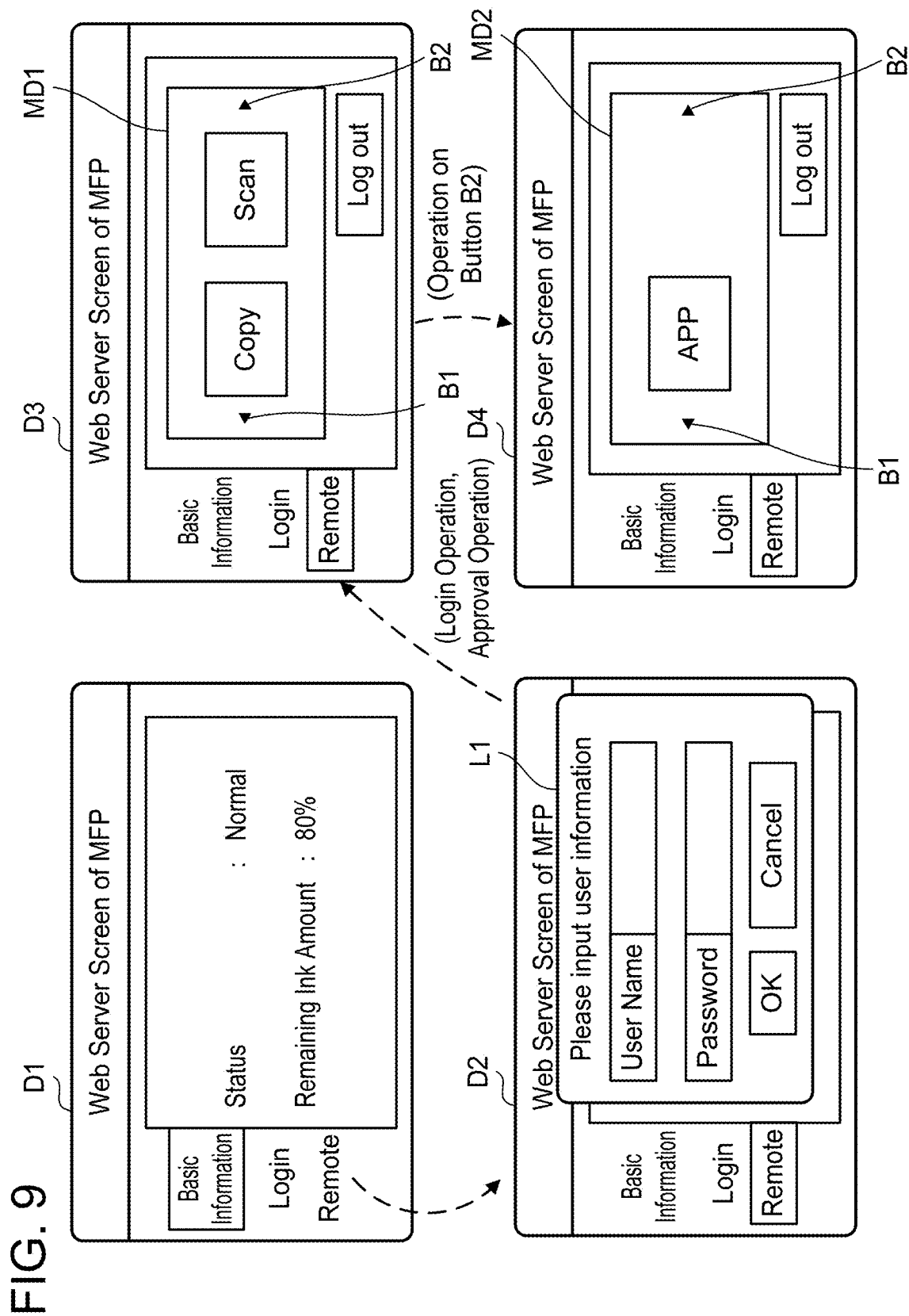
FIG. 9 shows examples of screens displayed on a PC.

Upon accepting input of an IP address assigned to the MFP 10 in T10, the PC 100 sends a top screen request to the MFP 10 in T12, receives top screen data from the MFP 10 in T14, and displays a top screen D1 represented by the top screen data in T16. As shown in FIG. 9, the screen D1 includes a basic information field, a basic information tab, a login tab, and a remote operation tab. In the basic information field of the screen D1, the current status and remaining ink amount of the MFP 10 are described.

Upon accepting selection of the remote operation tab in the top screen D1 in T20, the PC 100 sends a remote operation request indicating that execution of a remote operation is requested to the MFP 10 in T22, receives remote preparation screen data including login image data from the MFP 10 in T24, and displays a remote preparation screen D2 represented by the remote preparation screen data including the login image data in T26. As shown in FIG. 9, a login image L1 is displayed in the screen D2. The login image L1 includes a user name input field, a password input field, an OK button, and a cancel button.

Upon accepting input of the user name U1 and the password P1 and selection of the OK button in T30, the PC 100 sends an authentication request including the user name U1 and the password P1 to the MFP 10 in T32.

Upon receiving the authentication request from the PC 100 in T32, the MFP 10 determines in T34 that user authentication is successful because the combination of the user name U1 and the password P1 in the authentication request is in the memory 34, and displays a remote approval screen AP1 in T36. The screen AP1 includes a message asking whether execution of the remote operation function by the MFP 10 is to be approved, a YES button, and a NO button. Upon accepting selection of the YES button in T38, the MFP 10 determines that execution of the remote operation function has been approved, and sends in T40, to the PC 100, remote screen data including MFP image data corresponding to the screen that is currently being displayed on the display 14 of the MFP 10.

Upon receiving the remote screen data from the MFP 10 in T40, the PC 100 displays in T42 a remote screen D3 represented by the received remote screen data. As shown in FIG. 9, on the screen D3, an MFP image MD1 represented by the received MFP image data and a logout button are displayed in a remote information field. The MFP image MD1 includes a copy button, a scan button, and page switch buttons B1, B2. By selecting a button on the MFP image MD1, the user of the PC 100 (i.e., the administrator) can cause the MFP 10 to execute the same process as a process the MFP 10 executes when the same button is selected on the display 14. Upon accepting selection of the page switch button B2 in T44, the PC 100 sends a page switch request to the MFP 10 in T46.

Upon receiving the page switch request from the PC 100 in T46, the MFP 10 switches the page being displayed on the display 14 of the MFP 10, and sends remote screen data including MFP image data corresponding to the page after the switching to the PC 100 in T48.

Upon receiving the remote screen data from the MFP 10 in T48, the PC 100 displays in T50 a remote screen D4 represented by the received remote screen data. As shown in FIG. 9, the screen D4 is the same as the remote screen D3 except that an MFP image MD2 including an application selection button is displayed in the remote information field. Upon accepting selection of the logout button in T60, the PC 100 sends a logout request to the MFP 10 in T62.

Upon receiving the logout request from the PC 100 in T62, the MFP 10 ends the execution of the remote operation function in T64. Upon completion of T64, the process of FIG. 2 ends.

Figure 3:
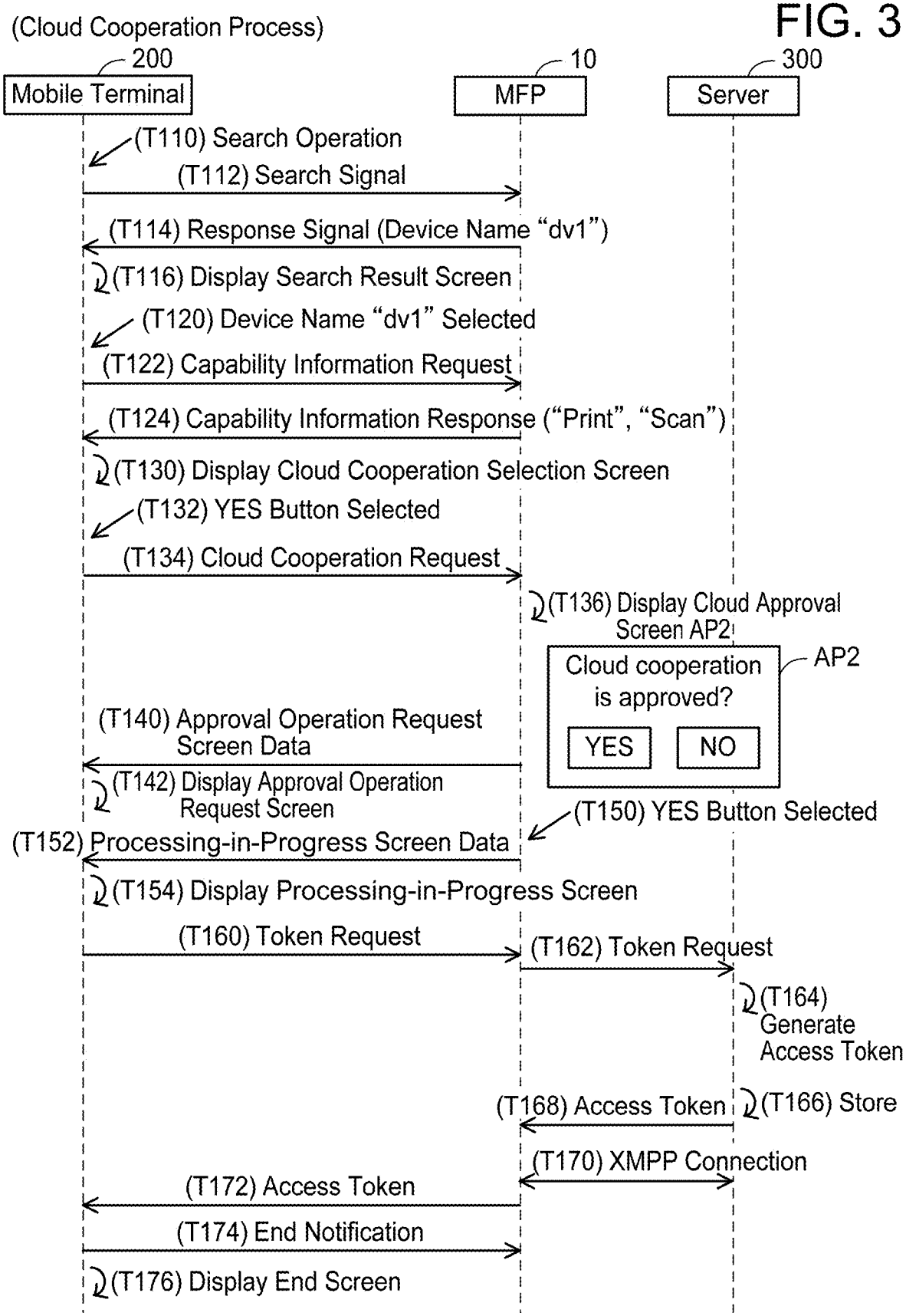
FIG. 3 shows a sequence diagram of a cloud cooperation process.

(Cloud Cooperation Process; FIG. 3)

Next, a cloud cooperation process for causing the MFP 10 to execute a cloud cooperation function will be described with reference to FIG. 3. The cloud cooperation function is a function of communicating with the server 300.

Upon accepting an operation for searching for MFPs present in the vicinity of the mobile terminal 200 in T110, the mobile terminal 200 sends a search signal by broadcasting to the LAN 6 in T112.

Upon receiving the search signal from the mobile terminal 200 in T112, the MFP 10 sends a response signal including the device name "dv1" to the mobile terminal 200 in T114.

Upon receiving the response signal from the MFP 10 in T114, the mobile terminal 200 displays a search result screen including the device name "dv1" in T116. This screen includes a cancel button and a list of device names of MFPs that received the response signal. Upon accepting selection of the device name "dv1" included in the list of device names in T120, the mobile terminal 200 sends in T122, to the MFP 10, a capability information request for checking what functions the MFP 10 is capable of executing, and receives a capability information response indicating that the MFP 10 is capable of executing the print function and the scan function from the MFP 10 in T124. Next, the mobile terminal 200 displays in T130 a cloud cooperation selection screen for selecting whether to execute cloud cooperation with the MFP 10. Upon accepting selection of a YES button in the cloud cooperation selection screen in T132, the mobile terminal 200 sends a cloud cooperation request to the MFP 10 in T134.

Upon receiving the cloud cooperation request from the mobile terminal 200 in T134, the MFP 10 displays a cloud approval screen AP2 in T136. The screen AP2 includes a message checking whether execution of the cloud cooperation function by the MFP 10 is to be approved, a YES button, and a NO button. In T140, the MFP 10 sends approval operation request screen data to the mobile terminal 200.

Upon receiving the approval operation request screen data from the MFP 10 in T140, the mobile terminal 200 displays an approval operation request screen in T142. This screen includes a message requesting that operation be performed on a button in the cloud approval screen AP2 displayed on the MFP 10.

Upon accepting selection of the YES button in the cloud approval screen AP2 in T150, the MFP 10 starts a cloud cooperation procedure for communicating with the server 300. First, in T152, the MFP 10 sends processing-in-progress screen data to the mobile terminal 200.

Upon receiving the processing-in-progress screen data from the MFP 10 in T152, the mobile terminal 200 displays a processing-in-progress screen in T154. This screen includes a message that the procedure for executing the cloud cooperation function is in progress. Next, the mobile terminal 200 sends a token request to the MFP 10 in T160. The token request is a command requesting, via the MFP 10, the server 300 to send an access token.

Upon receiving the token request from the mobile terminal 200 in T160, the MFP 10 sends the token request to the server 300 in T162.

Upon receiving the token request from the MFP 10 in T162, the server 300 generates an access token which is a unique character string in T164, stores the generated access token in T166, and sends the generated access token to the MFP 10 in T168.

Upon receiving the access token from the server 300 in T168, the MFP 10 establishes an XMPP (Extensible Messaging and Presence Protocol) connection with the server 300 in T170 by using the received access token. The XMPP connection is a so-called full-time connection and remains established until the MFP 10 is turned off. By using the XMPP connection, the server 300 can send a request to the MFP 10 over the firewall of the LAN 6 to which the MFP 10 belongs, without receiving a request from the MFP 10. Next, in T172, the MFP 10 sends the access token received in T168 to the mobile terminal 200.

Upon receiving the access token from the MFP 10 in T172, the mobile terminal 200 sends an end notification indicating that the access token has been received to the MFP 10 in T174, and displays an end screen including a message that the cloud cooperation procedure has ended in T176. Thereby, the user of the mobile terminal 200 can acknowledge that the procedure for the MFP 10 to communicate with the server 300 has been completed. Upon completion of T176, the process of FIG. 3 ends. As a result, the user of the mobile terminal 200 can cause the MFP 10 to execute a remote print function and a scan-to-mobile function. The remote print function is a function of causing the MFP 10 to execute printing according to a print job sent from the mobile terminal 200. Specifically, the MFP 10 receives a print job from the mobile terminal 200 via the server 300 and stores the print job. Then, upon accepting an operation for printing the stored print job, the MFP 10 executes printing according to the print job. The scan-to-mobile function is a function of sending scan image data generated by the MFP 10 to the mobile terminal 200 via the server 300.

Figure 4:
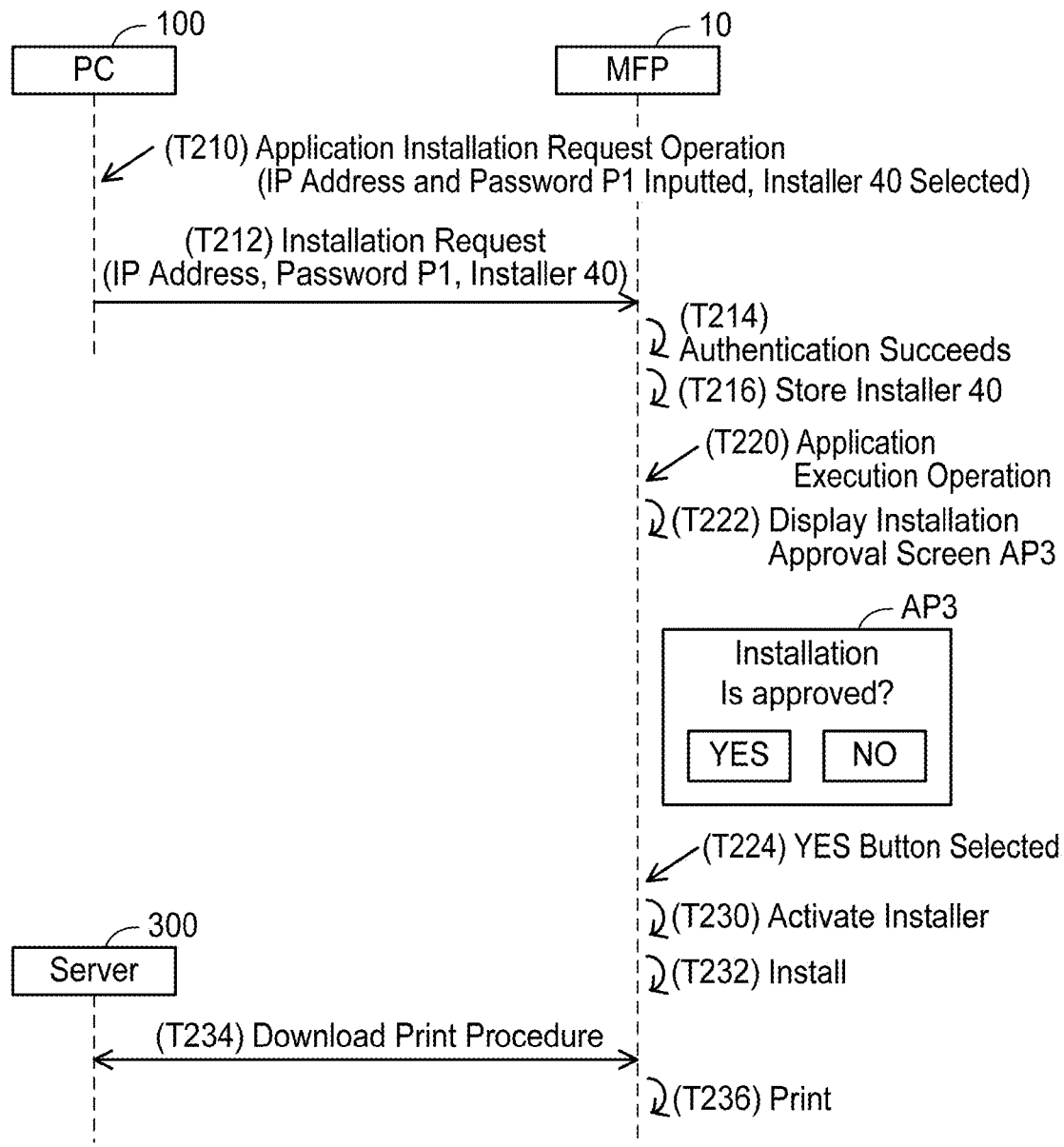
FIG. 4 shows a sequence diagram of an application installation process.

(Application Installation Process; FIG. 4)

Next, an application installation process for causing the MFP 10 to execute an installation function will be described with reference to FIG. 4. The installation function is a function of installing a new application 38.

Upon accepting input of the IP address assigned to the MFP 10, input of the password P1, and selection of an installer 40 in T210, the PC 100 sends an installation request including the IP address, the password P1, and the installer 40 to the MFP 10 in T212. The installer 40 is a program for installing the application 38 in the MFP 10.

Upon receiving the installation request from the PC 100 in T212, the MFP 10 determines in T214 that authentication is successful because the password P1 is in the memory 34, and stores the installer 40 included in the installation request in the memory 34 in T216. Next, upon accepting an operation for executing the application 38 corresponding to the installer 40 in T220 (hereinbelow, this operation will be termed "application execution operation"), the MFP 10 displays an installation approval screen AP3 in T222. The screen AP3 includes a message checking whether execution of the function of installing the application 38 by the MFP 10 is to be approved, a YES button, and a NO button. Upon accepting selection of the YES button in T224, the MFP 10 activates the installer 40 in T230, and installs the application 38 according to the installer 40 in T232. When the installation of the application 38 is completed, the MFP 10 executes the download print function. Specifically, the MFP 10 executes a download print procedure with the server 300 in T234 to receive image data stored in the server 300 from the server 300, and prints the image represented by the received image data in T236. Upon completion of T236, the process of FIG. 4 ends.

Figure 5:
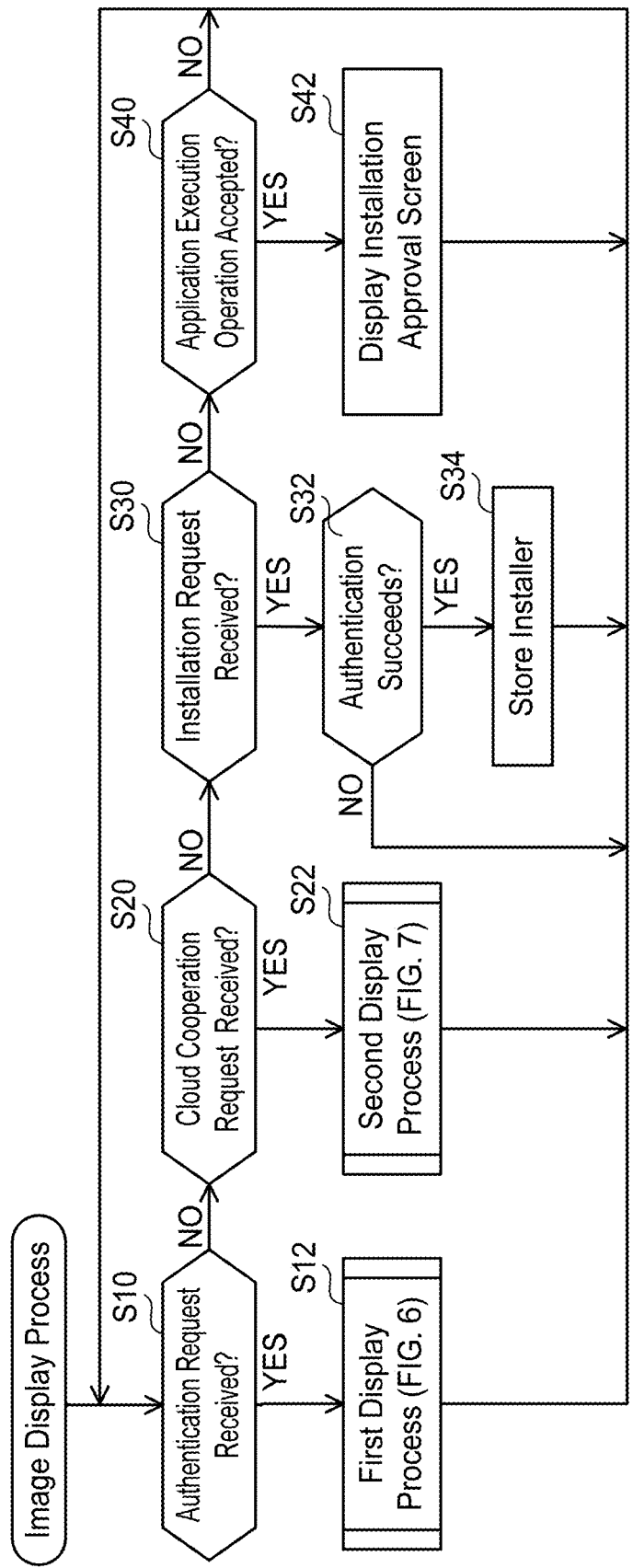
FIG. 5 shows a flowchart of an image display process.

(Image Display Process; FIG. 5)

Next, an image display process executed by the CPU 32 of the MFP 10 will be described with reference to FIG. 5. The image display process is a process for displaying any one of the approval screens AP1, AP2, and AP3 on the display 14. The CPU 32 starts the process of FIG. 5 when the MFP 10 is turned on.

In S10, the CPU 32 monitors whether an authentication request is received from a target device. In a case where an authentication request is received from the target device (YES in S10) (T32 of FIG. 2), the CPU 32 proceeds to S12.

Figure 6:
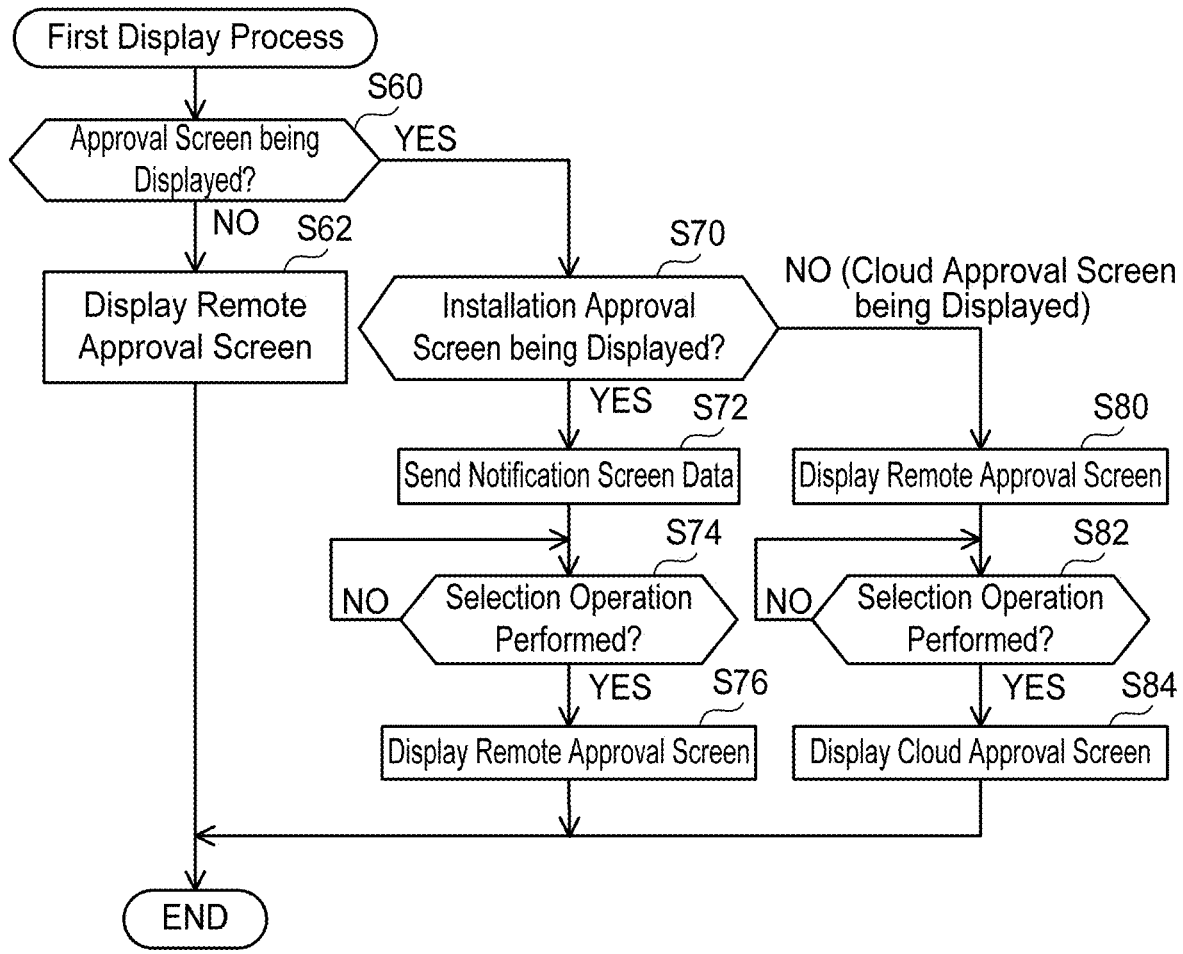
FIG. 6 shows a flowchart of a first display process.

In S12, the CPU 32 executes a first display process (FIG. 6). The first display process is a process for determining the timing at which the remote approval screen AP1 (see FIG. 2) is displayed on the display 14. Upon completion of S12, the CPU 32 returns to S10.

Simultaneously with the monitoring of S10, the CPU 32 monitors whether a cloud cooperation request is received from the target device in S20. In a case where a cloud cooperation request is received from the target device (YES in S20) (T134 of FIG. 3), the CPU 32 proceeds to S22.

Figure 7:
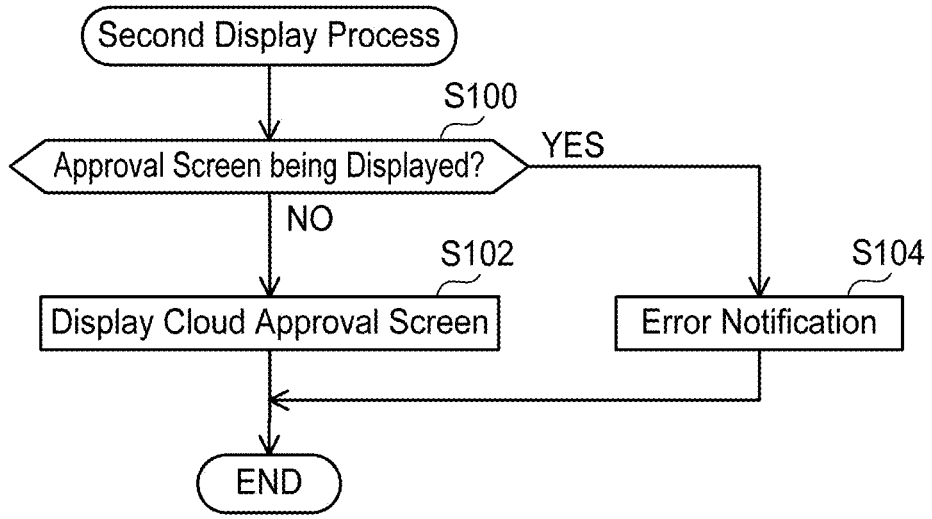
FIG. 7 shows a flowchart of a second display process.

In S22, the CPU 32 executes a second display process (FIG. 7). The second display process is a process for determining whether to display the cloud approval screen AP2 (see FIG. 4) on the display 14. Upon completion of S22, the CPU 32 returns to S10.

Simultaneously with the monitoring of S10 and S20, the CPU 32 monitors whether an installation request is received from the target device in S30. In a case where an installation request is received from the target device (YES in S30) (T212 of FIG. 4), the CPU 32 proceeds to S32.

In S32, the CPU 32 executes user authentication by using a user name and a password in the installation request (see T212 of FIG. 4). In a case where the combination of the user name and the password in the installation request is in the memory 34, i.e., in a case where the user authentication is successful (T214), the CPU 32 determines YES in S32 and proceeds to S34. On the other hand, in a case where the combination of the user name and the password in the installation request is not in the memory 34, i.e., in a case where the user authentication fails, the CPU 32 determines NO in S32, and returns to S10.

In S34, the CPU 32 stores an installer included in the installation request in the memory 34 (T216 of FIG. 4). Upon completion of S34, the CPU 32 returns to S10.

Simultaneously with the monitoring of S10, S20, and S30, the CPU 32 monitors whether the application execution operation is performed by the user in S40. In a case where the application execution operation is performed by the user (T220 of FIG. 4), the CPU 32 determines YES in S40 and proceeds to S42. In the present embodiment, the user cannot perform the application execution operation under a state where the remote approval screen AP1 or the cloud approval screen AP2 is displayed on the display 14 of the MFP 10. That is, in the case of YES in S40, neither of the approval screen AP1 nor AP2 is being displayed on the display 14 of the MFP 10.

In S42, the CPU 32 displays on the display 14 the installation approval screen AP3 (see T236 of FIG. 4) for causing the user to approve the installation of the application selected in S40. Upon completion of S42, the process returns to S10.

(First Display Process; FIG. 6)

Next, the first display process executed in S12 of FIG. 5 will be described with reference to FIG. 6. In S60, the CPU 32 determines whether the cloud approval screen AP2 or the installation approval screen AP3 is being displayed on the display 14. In a case of determining that the cloud approval screen AP2 or the installation approval screen AP3 is being displayed on the display 14 (YES in S60), the CPU 32 proceeds to S70. On the other hand, in a case of determining that neither of the installation approval screen AP3 nor the cloud approval screen AP2 is being displayed on the display 14 (NO in S60), the CPU 32 proceeds to S62. In S62, the CPU 32 displays the remote approval screen AP1 on the display 14 (T36 of FIG. 2).

In S70, the CPU 32 determines whether the installation approval screen AP3 is being displayed on the display 14. In a case where the installation approval screen AP3 is being displayed on the display 14 (YES in S70), the CPU 32 proceeds to S72. On the other hand, in a case where the installation approval screen AP3 is not being displayed on the display 14, i.e., in a case where the cloud approval screen AP2 is being displayed on the display 14 (NO in S70), the CPU 32 proceeds to S80.

Figure 10:
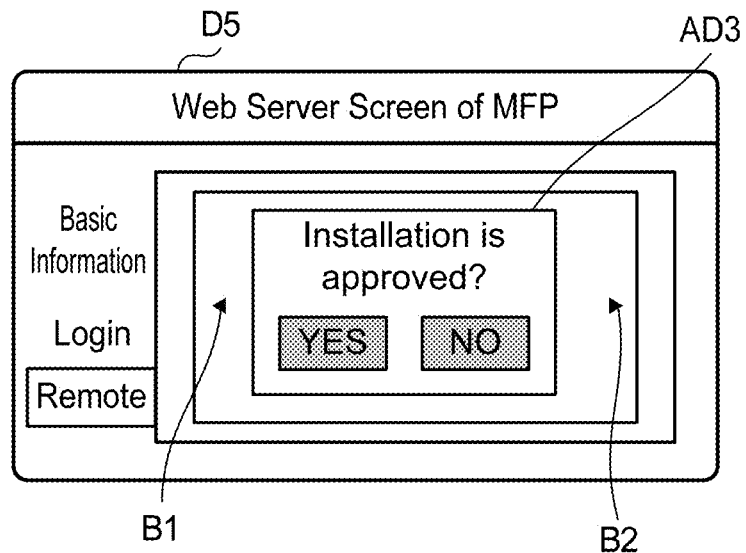
FIG. 10 shows an example of a screen displayed on the PC.

In S72, the CPU 32 sends notification screen data representing a notification screen D5 to the target device. As shown in FIG. 10, the screen D5 is the same as the remote screen D3 (see FIG. 9) except that it includes an approval image AD3 corresponding to the installation approval screen AP3 currently displayed on the display 14 of the MFP 10. Based on the approval image AD3 on the notification screen D5, the user of the target device can acknowledge that the remote approval screen AP1 is not displayed on the display 14 because the installation approval screen AP3 is being displayed on the display 14. In the image AD3, the YES button and the NO button are displayed in a so-called grayed-out manner, and these buttons are disabled. Thereby, it is possible to prevent a third party who knows the user name U1 and the password P1 from approving that the MFP 10 is to execute installation function. Consequently, the security of the MFP 10 can be increased.

In S74, the CPU 32 monitors whether a selection operation of selecting the YES button or the NO button in the installation approval screen AP3 is performed by the user. In a case where the selection operation is performed by the user, the CPU 32 determines YES in S74 and proceeds to S76.

In S76, the CPU 32 displays the remote approval screen AP1 on the display 14 instead of the installation approval screen AP3. In a case of accepting selection of the YES button from the user in S74, the CPU 32 executes the installation function in parallel with the process of S76. Upon completion of S76, the CPU 32 ends the process of FIG. 6.

In S80, the CPU 32 displays the remote approval screen AP1 on the display 14 instead of the cloud approval screen AP2.

In S82, the CPU 32 monitors whether a selection operation of selecting the YES button or the NO button in the remote approval screen AP1 is performed by the user. In a case where the selection operation is performed by the user, the CPU 32 determines YES in S82 and proceeds to S84.

In S84, the CPU 32 displays the cloud approval screen AP2 on the display 14 instead of the remote approval screen AP1. In a case of accepting selection of the YES button from the user in S82, the CPU 32 executes the remote operation function in parallel with the process of S84. Upon completion of S84, the CPU 32 ends the process of FIG. 6.

(Second Display Process; FIG. 7)

Next, a second display process executed in S22 of FIG. 5 will be described with reference to FIG. 7. In S100, the CPU 32 determines whether the remote approval screen AP1 or the installation approval screen AP3 is being displayed on the display 14. In a case of determining that neither of the remote approval screen AP1 nor the installation approval screen AP3 is being displayed on the display 14 (NO in S100), the CPU 32 proceeds to S102. On the other hand, in a case of determining that the remote approval screen AP1 or the installation approval screen AP3 is being displayed on the display 14 (YES in S100), the CPU 32 proceeds to S104.

In S102, the CPU 32 displays the cloud approval screen AP2 on the display 14 (T136 of FIG. 3). Upon completion of S102, the CPU 32 ends the process of FIG. 7.

In S104, the CPU 32 sends, to the target device, an error notification indicating that the cloud approval screen AP2 is not being displayed on the display 14. Upon completion of S102, the CPU 32 ends the process of FIG. 7.

Figure 8:
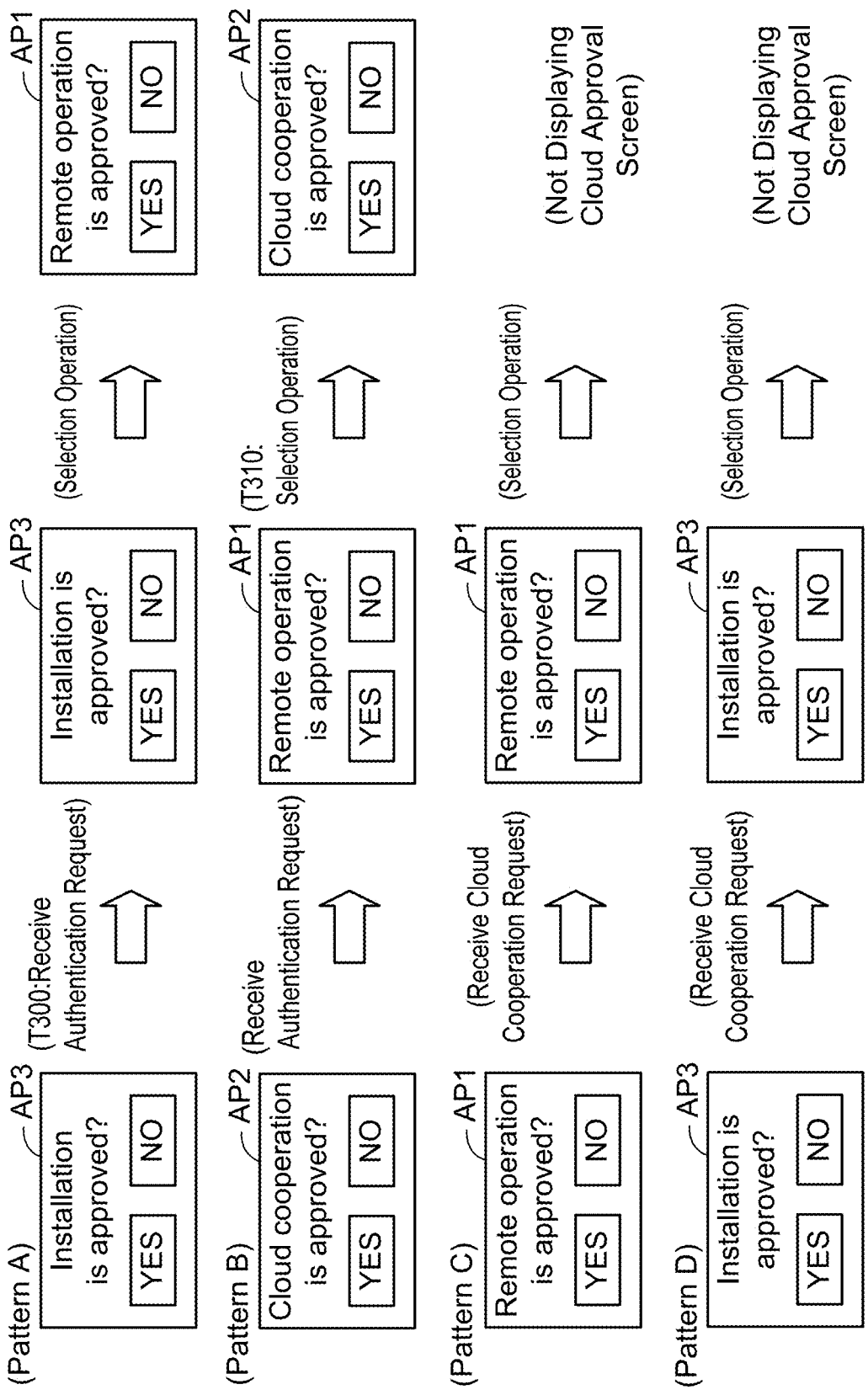
FIG. 8 shows Pattern A to Pattern D explaining transitions of approval screens displayed on an MFP.

(Pattern A to Pattern D; FIG. 8)

Next, Pattern A to Pattern D, which are transition patterns of the approval screens displayed on the display 14 of the MFP 10 by the processes of FIG. 5 to FIG. 7, will be described with reference to FIG. 8.

(Pattern A; FIG. 8)

An initial state of Pattern A is a state in which the installation approval screen AP3 is displayed on the display 14 of the MFP 10, i.e., a state after T210 to T222 of FIG. 4 have been executed between the MFP 10 and the PC 100.

Upon receiving the authentication request from the PC 100 in T300 (YES in S10 of FIG. 5), the MFP 10 determines that the installation approval screen AP3 is being displayed on the display 14 (YES in S60, YES in S70 of FIG. 6) and sends the notification screen data to the PC 100. That is, the MFP 10 maintains the display of the installation approval screen AP3. Next, upon accepting selection of the YES button or the NO button in the installation approval screen AP3 from the user (YES in S74), the MFP 10 displays the remote approval screen AP1 (S76).

(Effect of Pattern A)

Generally, functions executed by the MFP 10 according to requests from the administrator are prioritized over functions executed by the MFP 10 according to requests from the general user. In the present embodiment, the remote operation function and the installation function are the functions executed by the MFP 10 according to requests from the administrator, while the cloud cooperation function is the function executed by the MFP 10 according to a request from the general user. As such, the display of the remote approval screen AP1 and the installation approval screen AP3, corresponding to the remote operation function and the installation function respectively, is prioritized over the display of the cloud approval screen AP2 corresponding to the cloud cooperation function. The display of the remote approval screen AP1 and the display of the installation approval screen AP3 have the same priority.

In Pattern A, in a case where the MFP 10 receives the authentication request from the PC 100 under a state where the installation approval screen AP3 is displayed, the MFP 10 does not display the remote approval screen AP1 instead of the installation approval screen AP3. When the two approval screens to be displayed on the display 14 have the same priority, it is desirable to preferentially display the approval screen corresponding to the request received earlier. As above, the MFP 10 can display the approval screens appropriately.

In a case where the MFP 10 accepts the selection operation under a state where the installation approval screen AP3 is displayed after the MFP 10 has received the authentication request from the PC 100 under a state where the installation approval screen AP3 was displayed, the MFP 10 displays the remote approval screen AP1 instead of the installation approval screen AP3. That is, after accepting the selection operation, the MFP 10 displays the remote approval screen AP1 on the display 14 without receiving the authentication request again. Thereby, the user of the PC 100 does not need to perform an operation for sending the authentication request to the MFP 10 from the PC 100 after having performed the selection operation in the installation approval screen AP3. Thus, the user convenience can be improved.

(Pattern B; FIG. 8)

An initial state of Pattern B is a state in which the cloud approval screen AP2 is displayed on the display 14 of the MFP 10, i.e., a state after T110 to T136 of FIG. 3 have been executed between the MFP 10 and the mobile terminal 200.

Figure 11:
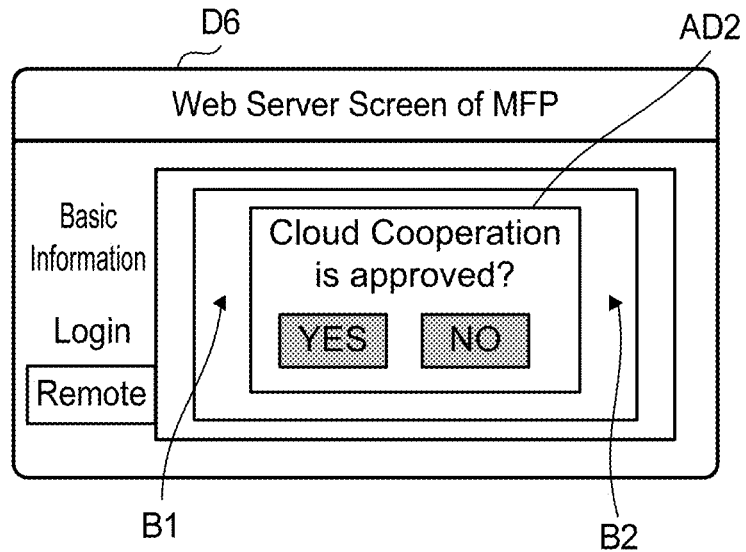
FIG. 11 shows an example of a screen displayed on the PC.

Upon receiving the authentication request from the PC 100 under a state where the cloud approval screen AP2 is displayed on the display 14 (YES in S10 of FIG. 5), the MFP 10 determines that the cloud approval screen AP2 is being displayed on the display 14 (YES in S60, NO in S70 of FIG. 6) and displays the remote approval screen AP1 instead of the cloud approval screen AP2. Next, upon accepting selection of the YES button or the NO button in the remote approval screen AP1 from the user in T310 (YES in S82), the MFP 10 displays the cloud approval screen AP2 (S84). In a case of accepting selection of the YES button in the remote approval screen AP1 from the user, the MFP 10 sends remote screen data representing a remote screen D6 to the PC 100 as well as displays the cloud approval screen AP2. As shown in FIG. 11, the screen D6 is the same as the notification screen D5 (see FIG. 10) except that it includes an approval image AD2 corresponding to the cloud approval screen AP2 currently displayed on the display 14 of the MFP 10. In the image AD2, the YES button and the NO button are displayed in a so-called grayed-out manner and these buttons are disabled. In this case, the user of the PC 100 (i.e., the administrator) can notify the user of the mobile terminal 200 that the selection operation needs to be performed on the YES button in the cloud approval screen AP2 currently displayed on the display 14 of the MFP 10 in order to cause the MFP 10 to execute the cloud cooperation function.

(Effect of Pattern B)

In Pattern B, in a case where the MFP 10 receives the authentication request from the PC 100 under a state where the cloud approval screen AP2 is displayed, the MFP 10 displays the remote approval screen AP1 instead of the cloud approval screen AP2. That is, when the remote approval screen AP1, which has higher priority, is to be displayed under a state where the cloud approval screen AP2 is displayed, the MFP 10 preferentially displays the remote approval screen AP1 instead of the cloud approval screen AP2. As above, the MFP 10 can appropriately display the higher-priority remote approval screen AP1.

In a case where the MFP 10 accepts the operation for approving execution of the remote operation function by the MFP 10 under a state where the remote approval screen AP1 is displayed after the remote approval screen AP1 was displayed instead of the cloud approval screen AP2, the MFP 10 displays the cloud approval screen AP2 instead of the remote approval screen AP1. That is, the MFP 10 displays the cloud approval screen AP2 after accepting the operation for approving execution of the remote operation function, without receiving the cloud cooperation request again. Thereby, after the YES button in the remote approval screen AP1 has been selected, the user of the mobile terminal 200 does not need to perform an operation for sending the cloud cooperation request from the mobile terminal 200 to the MFP 10. As such, the user convenience can be improved.

(Pattern C; FIG. 8)

An initial state of Pattern C is a state in which the remote approval screen AP1 is displayed on the display 14 of the MFP 10, i.e., a state after T10 to T36 of FIG. 2 have been executed between the MFP 10 and the PC 100.

Upon receiving the cloud cooperation request from the mobile terminal 200 (YES in S20 of FIG. 5) under a state where the remote approval screen AP1 is displayed, the MFP 10 determines that the remote approval screen AP1 is being displayed (YES in S100 of FIG. 7), maintains the display of the remote approval screen AP1, and sends the error notification to the mobile terminal 200 (S104). Even when accepting selection of the YES button or the NO button in the remote approval screen AP1 from the user, the MFP 10 does not display the cloud approval screen AP2.

(Effect of Pattern C)

In Pattern C, in a case where the MFP 10 receives the cloud cooperation request from the mobile terminal 200 under a state where the remote approval screen AP1 is displayed, the MFP 10 does not display the cloud approval screen AP2 instead of the remote approval screen AP1. As such, the MFP 10 can continue to appropriately display the higher-priority remote approval screen AP1.

In a case where the MFP 10 accepts the operation for approving execution of the remote operation function by the MFP 10 in a state where the remote approval screen AP1 is displayed after the MFP 10 received the cloud cooperation request from the mobile terminal 200 under a state where the remote approval screen AP1 was displayed, the MFP 10 does not display the cloud approval screen AP2 instead of the remote approval screen AP1. If the MFP 10 is configured to display the cloud approval screen AP2 after the remote approval screen AP1, it is impossible for the user of the mobile terminal 200 to know the reason why the cloud approval screen AP2 is not displayed in a state where the remote approval screen AP1 is displayed on the display 14 of the MFP 10. According to Pattern C, the user of the mobile terminal 200 can acknowledge, at an early stage, the reason why the cloud approval screen AP2 is not being displayed on the display 14.

(Pattern D; FIG. 8)

An initial state of pattern D is the same as the initial state of pattern A, i.e., the installation approval screen AP3 is being displayed on the display 14 of the MFP 10.

Upon receiving a cloud cooperation request from the mobile terminal 200 under a state where the installation approval screen AP3 is being displayed on the display 14 (YES in S40 of FIG. 5), the MFP 10 determines that the installation approval screen AP3 is being displayed on the display 14 (YES in S100 of FIG. 7), maintains the display of the installation approval screen AP3, and sends an error notification to the mobile terminal 200 (S104). Then, the MFP 10 does not display the cloud approval screen AP2 even if accepting selection from the user of the YES button or the NO button in the installation approval screen AP3.

(Effect of Pattern D)

In Pattern D, in a case of receiving the cloud cooperation request from the mobile terminal 200 under a state where the installation approval screen AP3 is displayed, the MFP 10 does not display the cloud approval screen AP2 instead of the installation approval screen AP3. The MFP 10 can continue to appropriately display the higher-priority installation approval screen AP3.

(Correspondence Relationships)

The MFP 10, the PC 100, and the mobile terminal 200 are an example of "function executing device", "first external device", and "second external device", respectively. The authentication request and the cloud cooperation request are an example of "first function executing request" and "second function executing request", respectively. The remote operation function and the cloud cooperation function are an example of "first function" and "second function", respectively. The remote approval screen AP1 and the cloud approval screen AP2 are an example of "first approval screen" and "second approval screen", respectively. The operation on the YES button in the remote approval screen AP1 is an example of "operation for approving that the function executing device is to execute the first function". The PC 100 is an example of "third external device". The installation request is an example of "third function executing request". The installation approval screen AP3 is an example of "third approval screen". The installation function is an example of "third function". The operation on the YES button in the installation approval screen AP3 is an example of "operation for approving that the function executing device is to execute the third function". The application execution operation is an example of "predetermined operation".

S10 and S20 of FIG. 5 are an example of "receive a first function executing request" and "receive a second function executing request", respectively. S62 of FIGS. 6 and S100, S102 of FIG. 7 are examples of "display a first approval screen" and "display a second approval screen".

(Variant 1) The CPU 32 may maintain the display of the cloud approval screen AP2 in a case of determining NO in S70 of FIG. 6, and may display the remote approval screen AP1 on the display 14 in a case where the selection operation of selecting the YES button or the NO button in the cloud approval screen AP2 is performed by the user. In the present variant, S80 to S84 can be omitted.

(Variant 2) In a case where the selection operation is accepted under a state where the remote approval screen AP1 is displayed on the display 14 after the remote approval screen AP1 was displayed on the display 14 instead of the cloud approval screen AP2 (YES in S82), the CPU 32 may not display the cloud approval screen AP2 on the display 14 instead of the remote approval screen AP1. In the present variant, S84 can be omitted.

(Variant 3) In the case where the selection operation for selecting the YES button or the NO button has been executed by the user in the approval screen currently being displayed after YES was determined in S100 of FIG. 7, the CPU 32 may cause the cloud approval screen AP2 to be displayed on the display 14. In the present variant, S104 can be omitted.

(Variant 4) In the case where YES was determined in S70 of FIG. 7, in a case where the remote approval screen AP1 is displayed in the display 14 and a selection operation for selecting the YES button or the NO button in the remote approval screen AP1 has been executed by the user, the CPU 32 may cause the display 14 to display the installation approval screen AP3. In the present variant, in a case where the two approval screens to be displayed by the display 14 have the same priority, the CPU 32 preferentially displays the approval screen corresponding to the request received later. In the present variant, S72 to S76 can be omitted.

(Variant 5) In a case where the CPU 32 accepts an operation for approving that the MFP 10 is to execute the installation function under a state where the installation approval screen AP3 is displayed on the display 14 after the authentication request was received from the target device under a state where the installation approval screen AP3 was displayed on the display 14 (YES in S74 of FIG. 6), the CPU 32 may not display the remote approval screen AP1 on the display 14 instead of the installation approval screen AP3. In the present variant, S72 to S76 can be omitted.

(Variant 6) In the case where the installation request is received from the target device (YES in S30), the CPU 32 may cause the installation approval screen AP3 to be displayed on the display 14. In the present variant, in a case where the installation request is received from the target device under a state where the remote approval screen AP1 is displayed, the CPU 32 does not cause the installation approval screen AP3 instead of the remote approval screen AP1 to be displayed on the display 14. On the other hand, in a case where the installation request is received from the target device under a state where the cloud approval screen AP2 is being displayed, the CPU 32 causes the display 14 to display the installation approval screen AP3 instead of the cloud approval screen AP2. In the present variant, the authentication request and the installation request are an example of "first function executing request". Further, the remote approval screen AP1 and the installation approval screen AP3 are examples of "first approval screen". Further, the remote operation function and the installation function are examples of "first function".

(Variant 7) The MFP 10 may be configured to accept the application execution operation under a state where the remote approval screen AP1 or the cloud approval screen AP2 is displayed on the display 14. In the present variant, in a case of accepting the application execution operation under a state where the remote approval screen AP1 is displayed, the CPU 32 does not display the installation approval screen AP3 on the display 14 instead of the remote approval screen AP1. On the other hand, in a case of accepting the application execution operation under a state where the cloud approval screen AP2 is displayed, the CPU 32 display the installation approval screen AP3 on the display 14 instead of the cloud approval screen AP2. In the present variant, the authentication request and the installation request are examples of "first function executing request". Further, the remote approval screen AP1 and the installation approval screen AP3 are examples of "first approval screen". Further, the remote operation function and the installation function are examples of "first function".

(Variant 8) S72 of FIG. 6 can be omitted. In the present variant, "send notification screen data" can be omitted.

(Variant 9) The image corresponding to the installation approval screen AP3 included in the notification screen D5 may not include the YES button or the NO button.

(Variant 10) The memory 34 of the MFP 10 may store priorities of the remote operation function, the cloud cooperation function, and the installation function. For example, the priorities of the remote operation function and the installation function are "high", and the priority of the cloud cooperation function is "low". Then, in S70 of FIG. 6, the CPU 32 may determine the approval screen to be displayed on the display 14 based on the priorities in the memory 34.

(Variant 11) The "function executing device" is not limited to the MFP 10, and may be another device such as a printer, a scanner, a PC, or the like.

(Variant 12) In each of the above embodiments, the respective processes of FIG. 2 to FIG. 8 are implemented by software (i.e., the program 36). Instead of this, one or more of the processes may be implemented by hardware such as a logic circuit.

What is claimed is:

1. A function executing device comprising:
    a communication interface;
    a display; and
    a controller configured to:
    receive a first function executing request from a first external device via the communication interface;
    receive a second function executing request from a second external device via the communication interface, the second function executing request being different from the first function executing request;
    in a case where the first function executing request is received from the first external device, display a first approval screen on the display, the first approval screen being for approving that the function executing device is to execute a first function; and
    in a case where the second function executing request is received from the second external device, display a second approval screen on the display, the second approval screen being different from the first approval screen, the second approval screen being for approving that the function executing device is to execute a second function different from the first function,
    wherein in a case where the second function executing request is received from the second external device under a state where the first approval screen is displayed on the display, the second approval screen is not displayed on the display instead of the first approval screen.

2. The function executing device as in claim 1, wherein the controller is further configured to:
    in a case where the first function executing request is received from the first external device under a state where the second approval screen is displayed on the display, display the first approval screen on the display instead of the second approval screen.

3. The function executing device as in claim 2, wherein the controller is further configured to:
    in a case where an operation for approving that the function executing device is to execute the first function is accepted under a state where the first approval screen is displayed on the display after the first approval screen has been displayed on the display instead of the second approval screen, display the second approval screen on the display instead of the first approval screen.

4. The function executing device as in claim 1, wherein in a case where an operation for approving that the function executing device is to execute the first function is accepted under a state where the first approval screen is displayed on the display after the second function executing request has been received from the second external device, the second approval screen is not displayed on the display instead of the first approval screen.

5. The function executing device as in claim 1, wherein the controller is further configured to:
    receive a third function executing request from a third external device via the communication interface, the third function executing request being different from the first and second function executing requests; and
    in a case where the third function executing request is received from the third external device, display a third approval screen on the display, the third approval screen being different from the first and second approval screens, the third approval screen being for approving that the function executing device is to execute a third function different from the first and second functions,
    wherein in a case where the first function executing request is received from the first external device under a state where the third approval screen is displayed on the display, the first approval screen is not displayed on the display instead of the third approval screen.

6. The function executing device as in claim 5, wherein the controller is further configured to:
    in a case where an operation for approving that the function executing device is to execute the third function is accepted under a state where the third approval screen is displayed on the display after the first function executing request has been received from the first external device, display the first approval screen on the display instead of the third approval screen.

7. The function executing device as in claim 5, wherein the controller is configured to:
    in a case where a predetermined operation is performed by a user after the third function executing request has been received from the third external device, display the third approval screen on the display.

8. The function executing device as in claim 5, wherein the controller is further configured to:
    in the case where the first function executing request is received from the first external device under the state where the third approval screen is displayed on the display, send notification screen data representing a notification screen to the first external device, the notification screen indicating that the third approval screen is currently displayed on the display.

9. The function executing device as in claim 8, wherein the notification screen includes an image corresponding to the third approval screen currently displayed on the display, and
    in the image, a button for approving that the function executing device is to execute the third function is disabled.

10. The function executing device as in claim 5, wherein the first function is a function of accepting a remote operation,
    the second function is a function of communicating with a server, and the third function is a function of installing an application program.

11. A non-transitory computer-readable recording medium storing computer-readable instructions for a function executing device,
wherein the computer-readable instructions, when executed by a processor of the function executing device, cause the function executing device to:
receive a first function executing request from a first external device via the communication interface;
receive a second function executing request from a second external device via the communication interface, the second function executing request being different from the first function executing request;
in a case where the first function executing request is received from the first external device, display a first approval screen on a display of the function executing device, the first approval screen being for approving that the function executing device is to execute a first function; and
in a case where the second function executing request is received from the second external device, display a second approval screen on the display, the second approval screen being different from the first approval screen, the second approval screen being for approving that the function executing device is to execute a second function different from the first function,
wherein in a case where the second function executing request is received from the second external device under a state where the first approval screen is displayed on the display, the second approval screen is not displayed on the display instead of the first approval screen.

* * * * *